US011191390B2

(12) United States Patent
Gogel (10) Patent No.: US 11,191,390 B2
(45) Date of Patent: Dec. 7, 2021

(54) TEMPERATURE MANAGEMENT OF COOKING MEDIUM IN FRYERS AROUND FILTRATION CYCLES

(71) Applicant: Henny Penny Corporation, Eaton, OH (US)

(72) Inventor: Mark Gogel, Fairborn, OH (US)

(73) Assignee: Henny Penny Corporation, Eaton, OH (US)

( * ) Notice: Subject to any disclaimer, the term of this patent is extended or adjusted under 35 U.S.C. 154(b) by 378 days.

(21) Appl. No.: 16/083,169

(22) PCT Filed: Mar. 17, 2017

(86) PCT No.: PCT/US2017/022872
§ 371 (c)(1),
(2) Date: Sep. 7, 2018

(87) PCT Pub. No.: WO2017/161221
PCT Pub. Date: Sep. 21, 2017

(65) Prior Publication Data
US 2019/0082890 A1 Mar. 21, 2019

Related U.S. Application Data

(60) Provisional application No. 62/309,650, filed on Mar. 17, 2016.

(51) Int. Cl.
*A47J 37/12* (2006.01)
*B08B 9/093* (2006.01)

(52) U.S. Cl.
CPC ....... *A47J 37/1266* (2013.01); *A47J 37/1223* (2013.01); *A47J 37/1247* (2013.01);
(Continued)

(58) Field of Classification Search
CPC ........ A47J 27/18; A47J 37/0611; A47J 29/04; A47J 36/20; A47J 37/1219; A47J 37/1223;
(Continued)

(56) References Cited

U.S. PATENT DOCUMENTS 306,168 A * 10/1884 Moseley ................... C02F 1/02
210/175
2,535,905 A * 12/1950 Dawson .............. A47J 37/1242
99/408
(Continued)

FOREIGN PATENT DOCUMENTS

EA 11874 B1 6/2009
EP 2140789 A1 1/2010
(Continued)

OTHER PUBLICATIONS

European Patent Office, Extended European Search Report issued in Application No. 17767590.7-1006 dated Aug. 13, 2019 (6 pages).
(Continued)

*Primary Examiner* — Jimmy Chou
(74) *Attorney, Agent, or Firm* — Wood Herron & Evans LLP (57) ABSTRACT

Systems, methods, and computer program products are disclosed for controlling a fryer. In response to determining a filtration cycle is scheduled to occur after a current cooking cycle, a temperature set-point for a cooking medium is increased to pre-heat the cooking medium prior to the end of the cooking cycle. A heating element used to heat the cooking medium may be deactivated prior to entering the filtration cycle, and reactivated during the filtration cycle in response to the filtered cooking medium in the fry pot reaching a predetermined level. Activating the heating element during the filtration cycle may further heat the cooking medium prior to starting the next cooking cycle, thereby
(Continued)

reducing the total time needed for filtration and reheating for a subsequent cooking cycle.

14 Claims, 5 Drawing Sheets

(52) U.S. Cl.
CPC ....... *A47J 37/1261* (2013.01); *A47J 37/1271* (2013.01); *A47J 37/1285* (2013.01); *B08B 9/093* (2013.01); *B08B 2209/08* (2013.01)

(58) Field of Classification Search
CPC ............... A47J 37/1247; A47J 37/1261; A47J 37/1271; A47J 37/1285; B08B 9/093; B08B 2209/08
USPC ......... 99/330, 331, 336, 343, 346, 403, 405, 99/406, 407, 408; 126/373, 374, 376, 126/391, 351
See application file for complete search history.

(56) References Cited

U.S. PATENT DOCUMENTS

| | | | | |
|---|---|---|---|---|
| 2,907,659 A * | 10/1959 | Anetsberger | ............ | A47J 37/12 426/438 |
| 3,217,633 A * | 11/1965 | Anetsberger | ........ | A47J 37/1247 99/327 |
| 3,667,374 A | 6/1972 | Holmes | | |
| 3,735,693 A | 5/1973 | Pelster et al. | | |
| 3,760,793 A * | 9/1973 | Anetsberger | ............ | A47J 36/38 126/391.1 |
| 3,797,375 A * | 3/1974 | Cerola | ................ | F24C 15/2042 99/340 |
| 4,058,703 A | 11/1977 | Price | | |
| 4,071,079 A * | 1/1978 | Engelbrecht | .............. | F22B 1/06 122/32 |
| 4,116,045 A * | 9/1978 | Potter | .................... | G01N 27/18 73/61.46 |
| 4,166,138 A | 8/1979 | Ziminski et al. | | |
| 4,397,299 A | 8/1983 | Taylor et al. | | |
| 4,437,159 A * | 3/1984 | Waugh | ................. | A47J 37/1219 219/492 |
| 4,502,373 A | 3/1985 | Keating | | |
| 4,580,549 A * | 4/1986 | Sato | ........................ | A47J 37/12 126/391.1 |
| 4,603,622 A * | 8/1986 | Beck | ........................ | A47J 37/12 210/540 |
| 4,668,390 A * | 5/1987 | Hurley | ................. | A47J 37/1233 126/369 |
| 4,684,412 A * | 8/1987 | Fritzsche | ............ | A47J 37/1233 126/392.1 |
| 4,688,549 A * | 8/1987 | Blankemeyer | .......... | A47J 36/18 126/373.1 |
| 4,769,249 A | 9/1988 | Webb | | |
| 4,848,318 A | 7/1989 | Brewer | | |
| 4,890,548 A * | 1/1990 | Grob | .................... | A47J 37/1223 99/330 |
| 4,899,649 A * | 2/1990 | Grob | .................... | A47J 37/1223 99/403 |
| 4,913,041 A * | 4/1990 | Taber | .................. | A47J 37/1242 126/343.5 A |
| 4,913,042 A * | 4/1990 | Miller | ................. | A47J 37/1214 99/336 |
| 4,968,518 A * | 11/1990 | Lopez | ..................... | A23D 9/04 210/DIG. 8 |
| 5,038,753 A * | 8/1991 | Yokoyama | .......... | A47J 37/1252 126/391.1 |
| 5,209,218 A * | 5/1993 | Daneshvar | .......... | A47J 37/1247 126/374.1 |
| 5,244,370 A | 9/1993 | DeMars | | |
| 5,301,847 A | 4/1994 | Fehr et al. | | |
| 5,402,713 A * | 4/1995 | King | ................... | A47J 37/1247 126/391.1 |
| 5,404,799 A * | 4/1995 | Bivens | ................. | A47J 37/1223 134/111 |
| 5,417,202 A * | 5/1995 | Cote | .................... | A47J 37/1247 126/391.1 |
| 5,487,907 A * | 1/1996 | Drown | ....................... | C11B 1/14 134/25.3 |
| 5,544,567 A * | 8/1996 | Davis | ...................... | A47J 36/32 99/336 |
| 5,609,093 A * | 3/1997 | Hohler | .................... | A47J 27/18 99/408 |
| 5,611,330 A * | 3/1997 | Corliss | ................. | A47J 37/1242 126/376.1 |
| 5,617,777 A * | 4/1997 | Davis | .................... | A47J 37/1223 99/408 |
| 5,632,197 A * | 5/1997 | Lubawy | ................ | A47J 37/1247 99/403 |
| 5,632,266 A * | 5/1997 | Sato | ......................... | A47J 37/12 126/391.1 |
| 5,680,811 A * | 10/1997 | Highnote | ............. | A47J 37/1233 99/408 |
| 5,746,195 A * | 5/1998 | Codazzi | ............... | A47J 37/1247 126/391.1 |
| 5,776,530 A | 7/1998 | Davis et al. | | |
| 5,799,570 A * | 9/1998 | Albisser | ..................... | A23L 5/23 99/495 |
| 5,809,995 A * | 9/1998 | Kobayashi | ............ | A47J 37/129 126/376.1 |
| 5,878,739 A * | 3/1999 | Guidry | ................. | A47J 37/0786 126/25 R |
| 5,901,641 A * | 5/1999 | McNamara | ......... | A47J 37/1247 99/403 |
| 5,970,853 A * | 10/1999 | Marszalek | ........... | A47J 37/1219 99/403 |
| 5,988,051 A | 11/1999 | Hashiguchi et al. | | |
| 6,009,794 A | 1/2000 | Casey et al. | | |
| 6,018,150 A * | 1/2000 | Maher, Jr. | ........... | G05D 23/1913 219/441 |
| 6,019,819 A * | 2/2000 | Williams | ............. | B01D 50/004 95/206 |
| 6,068,872 A | 5/2000 | Hashiguchi et al. | | |
| 6,101,929 A * | 8/2000 | Saito | .................... | A47J 37/1266 126/391.1 |
| 6,131,564 A * | 10/2000 | Song | .................... | A47J 37/1271 126/376.1 |
| 6,176,173 B1 * | 1/2001 | Holbrook | ............ | A47J 37/0682 126/41 R |
| 6,182,561 B1 | 2/2001 | Garner et al. | | |
| 6,202,543 B1 | 3/2001 | Moya et al. | | |
| 6,205,996 B1 * | 3/2001 | Ryan | .................... | A47J 37/0786 126/39 K |
| 6,254,790 B1 | 7/2001 | King et al. | | |
| 6,363,834 B1 * | 4/2002 | Song | .................... | A47J 37/1271 99/330 |
| 6,363,840 B1 * | 4/2002 | Song | .................... | A47J 37/1223 126/376.1 |
| 6,405,738 B1 | 6/2002 | Clark et al. | | |
| 6,745,669 B2 * | 6/2004 | Suzuki | ................. | A47J 37/1266 126/374.1 |
| 6,777,009 B1 | 8/2004 | Shealy | | |
| 6,844,529 B2 * | 1/2005 | Grohs | ................. | A47J 37/0676 219/450.1 |
| 6,935,223 B2 * | 8/2005 | Kobayashi | .......... | A47J 27/0817 126/374.1 |
| 7,231,918 B2 * | 6/2007 | Sato | ..................... | A47J 37/1271 126/291 |
| 7,669,520 B2 * | 3/2010 | De'Longhi | ......... | A47J 37/1219 99/336 |
| 7,703,388 B2 * | 4/2010 | Usui | .................... | A47J 37/1285 99/408 |
| 7,827,906 B1 * | 11/2010 | Carter | ................. | A47J 37/1242 99/367 |
| 8,111,979 B2 * | 2/2012 | Feinberg | ............. | A47J 37/1266 392/463 |
| 8,567,306 B2 * | 10/2013 | Kimura | ................ | A47J 37/1223 99/408 |
| 9,357,881 B2 * | 6/2016 | Gardner | ................ | G01F 23/246 |

(56) References Cited

U.S. PATENT DOCUMENTS

| | | | |
|---|---|---|---|
| 9,386,881 B1* | 7/2016 | Johnson | A47J 37/1266 |
| 2001/0054357 A1* | 12/2001 | Tateyama | A47J 37/1266 |
| | | | 99/330 |
| 2002/0023544 A1* | 2/2002 | Song | A47J 37/1209 |
| | | | 99/330 |
| 2002/0046657 A1* | 4/2002 | Takahashi | A47J 37/1223 |
| | | | 99/330 |
| 2003/0047084 A1* | 3/2003 | Shandross | A23L 5/11 |
| | | | 99/330 |
| 2005/0003041 A1* | 1/2005 | Kamil | C12C 7/22 |
| | | | 426/16 |
| 2005/0236402 A1 | 10/2005 | Christiaansen et al. | |
| 2005/0252506 A1* | 11/2005 | Sato | A47J 37/1271 |
| | | | 126/383.1 |
| 2006/0130670 A1 | 6/2006 | Johnson et al. | |
| 2006/0196366 A1* | 9/2006 | Jeuch | A47J 36/38 |
| | | | 99/403 |
| 2007/0012367 A1 | 1/2007 | Hotz et al. | |
| 2008/0041238 A1* | 2/2008 | Usui | A47J 37/1257 |
| | | | 99/408 |
| 2008/0121578 A1 | 5/2008 | Burkett et al. | |
| 2008/0213446 A1* | 9/2008 | Feinberg | A23L 5/11 |
| | | | 426/417 |
| 2008/0213448 A1* | 9/2008 | Feinberg | A47J 37/1266 |
| | | | 426/438 |
| 2009/0039004 A1* | 2/2009 | Andersen | A47J 37/1266 |
| | | | 210/167.28 |
| 2009/0064871 A1* | 3/2009 | Theodos | A47J 37/1223 |
| | | | 99/408 |
| 2009/0084273 A1* | 4/2009 | Lackman | A47J 37/1223 |
| | | | 99/408 |
| 2009/0205511 A1* | 8/2009 | Tienor | A23L 5/11 |
| | | | 99/403 |
| 2010/0116345 A1 | 5/2010 | Florkey et al. | |
| 2010/0212510 A1* | 8/2010 | Hutson | A47J 37/129 |
| | | | 99/331 |
| 2010/0300980 A1 | 12/2010 | Burkett et al. | |
| 2011/0129578 A1 | 6/2011 | Feinberg et al. | |
| 2011/0287154 A1* | 11/2011 | Reeser | A47J 37/1266 |
| | | | 426/438 |
| 2013/0008320 A1* | 1/2013 | Kilmer | A47J 37/1223 |
| | | | 99/408 |
| 2013/0098847 A1 | 4/2013 | Lambert et al. | |
| 2013/0136834 A1* | 5/2013 | French | A23L 5/11 |
| | | | 426/438 |
| 2014/0004234 A1* | 1/2014 | Mosteller | A47J 37/1266 |
| | | | 426/231 |
| 2015/0101966 A1* | 4/2015 | Coco | A47J 37/1223 |
| | | | 210/86 |
| 2015/0129509 A1* | 5/2015 | Winter | A23L 5/17 |
| | | | 210/741 |
| 2015/0272390 A1* | 10/2015 | Burns | A47J 37/1266 |
| | | | 99/330 |
| 2015/0374173 A1* | 12/2015 | McGhee | A47J 37/1266 |
| | | | 99/330 |
| 2016/0033463 A1* | 2/2016 | Robertson | G01N 33/03 |
| | | | 426/231 |
| 2016/0166112 A1* | 6/2016 | Florkey | A47J 37/1261 |
| | | | 426/231 |
| 2018/0333005 A1* | 11/2018 | Fritz | A47J 37/1257 |
| 2020/0329913 A1* | 10/2020 | Gogel | A47J 37/1247 |

FOREIGN PATENT DOCUMENTS

| | | |
|---|---|---|
| JP | 63150034 | 6/1988 |
| KR | 20150014634 A | 2/2015 |
| SU | 549140 A1 | 3/1977 |
| WO | 9406335 A1 | 3/1994 |
| WO | 2007035556 A2 | 3/2007 |

OTHER PUBLICATIONS

European Patent Office, Extended European Search Report issued in Application No. 17767646.7-1006 dated Aug. 13, 2019 (7 pages).

International Searching Authority, Search Report and Written Opinion issued in International Application No. PCT/US2017/022872 dated Jun. 12, 2017 (11 pages).

International Searching Authority, Search Report and Written Opinion issued in International Application No. PCT/US2017/022866 dated Jul. 24, 2017 (12 pages).

International Searching Authority, Search Report and Written Opinion issued in International Application No. PCT/US2017/022997 dated Aug. 17, 2017 (13 pages).

Russian Federal Institute of Industrial Property, Office Action and Search Report issued in RU 2018136366/10(060137) dated Jun. 11, 2020 with English Translations (14 pages).

Austrailian Government IP Austrailia, Examination Report No. 1 issued in AU 2017234798 dated Jul. 20, 2020 (3 pages).

European Patent Office, Extended European Search Report issued in Application No. 20185641.6-1004 dated Sep. 1, 2020 (6 pages).

\* cited by examiner

TEMPERATURE MANAGEMENT OF COOKING MEDIUM IN FRYERS AROUND FILTRATION CYCLES

CROSS-REFERENCE TO RELATED APPLICATIONS

This application claims the benefit of Provisional Application Ser. No. 62/309,650, filed Mar. 17, 2016, the disclosure of which is incorporated by reference herein.

TECHNICAL FIELD

The invention generally relates to fryers, and in particular, to systems and methods for managing the temperature of a cooking medium in the fryer around the time of filtration cycles.

BACKGROUND

Oil-based frying is commonly used as a cooking method for a wide range of food, such as poultry, fish, potato products, and the like. Commercial fryers include one or more fry pots (also referred to as cooking chambers) that are filled with a cooking medium such as oil or solid fats. Heat is typically provided to the cooking medium using an electrical heating element submerged in the cooking medium or a gas burner thermally coupled to the cooking medium though the walls of the fry pot. When the cooking medium reaches a preset cooking temperature, food products are placed into the cooking medium for a predetermined amount of time during which the food products are cooked by heat from the cooking medium. To facilitate insertion and removal of the food products, the food products are typically placed inside a container, such as a wire basket, and the container lowered into the cooking medium for the predetermined amount of time.

The cooking medium is normally re-used for multiple cooking cycles, which may include cooking cycles for different food products. However, the cooking medium degrades over time. This degradation may be due to contamination by particles shed by the food products being cooked and from chemical degradation due to heat, oxidation, and reactions with the food products. In addition, as food particles accumulate in the cooking medium, the flavor characteristics of the food particles may become infused in the cooking medium. This infusion may adversely affect the quality of cooked food. For at least these reasons, the cooking medium must occasionally be replaced.

To maintain cooking quality and to prolong the operational lifetime of the cooking medium, the cooking medium may be filtered periodically. The filtering process removes cooking by-products, such as suspended food particles ranging from dust-sized particles to larger pieces of crackling or crumbs, and small pieces of food product. Frequent filtering may extend the useful life of the cooking medium, thereby reducing the cost of operating the fryer by reducing the frequency with which the cooking medium must be replaced. The cost savings from filtering may be particularly beneficial when using a cooking medium that contains reduced amounts of trans-fats, which have become popular, but are typically more expensive than other types of cooking media. Thus, it may be economically beneficial to frequently filter the cooking medium to extend its useful life.

However, a downside of filtering is that the cooking medium experiences a drop in temperature during the filtration cycle. This drop in temperature normally delays the start of the next cooking cycle while the cooking medium is reheated to the cooking temperature set-point. This delay reduces the throughput of the fryer, and may also encourage users to skip filtration cycles, thereby causing the cooking medium to have a reduced service life.

Thus, there is a need for improved systems and methods for filtering the cooking medium in fryers that reduces the duration of the filtration cycle.

SUMMARY

In an embodiment of the invention, a fryer is provided. The fryer includes a fry pot and a controller that controls operation of the fryer. The controller is configured to control a temperature of a cooking medium in the fry pot using a first temperature set-point during a cooking cycle, determine if a filtration cycle is scheduled to follow the cooking cycle, and in response to determining the filtration cycle is scheduled to follow the cooking cycle, control the temperature of the cooking medium in the fry pot during the cooking cycle using a second temperature set-point that is higher than the first temperature set-point.

In another embodiment of the invention, a method of filtering the cooking medium in the fryer is provided. The method includes controlling the temperature of the cooking medium in the fry pot using the first temperature set-point during the cooking cycle, determining if the filtration cycle is scheduled to follow the cooking cycle, and, in response to determining the filtration cycle is scheduled to follow the cooking cycle, controlling the temperature of the cooking medium in the fry pot during the cooking cycle using the second temperature set-point that is higher than the first temperature set-point.

In another embodiment of the invention, a computer program product for controlling the fryer is provided. The computer program product includes a non-transitory computer-readable storage medium. The storage medium includes program code that, when executed by one or more processors of the fryer, causes the fryer to control the temperature of the cooking medium in the fry pot using the first temperature set-point during the cooking cycle, determine if the filtration cycle is scheduled to follow the cooking cycle, and, in response to determining the filtration cycle is scheduled to follow the cooking cycle, control the temperature of the cooking medium in the fry pot during the cooking cycle using the second temperature set-point that is higher than the first temperature set-point.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to systems and methods of controlling a fryer, and in particular, for reducing the duration of a filtration cycle by preemptively heating the cooking medium ahead of the filtration cycle. A significant amount of thermal energy, or heat, is normally lost from the cooking medium during the filtration cycle. This lost heat needs to be added back into to the filtered cooking medium before the next cooking cycle. Typical reheating times can extend the downtime associated with a filtration cycle by 20-60 seconds, depending on the amount of heat lost during the filtration cycle.

Embodiments of the invention address this problem by increasing the oil set-point temperature for at least a portion of the current cooking cycle in anticipation of a filtration cycle. This increase in the set-point temperature allows the heating element to build up additional energy in the cooking medium, the heat exchanger components, and the heating element itself ahead of the filtration cycle. This extra energy reduces the amount of time required to reheat the cooking medium by reducing the amount of energy that must be added subsequent to the filtration cycle to return to the cooking medium to the cooking cycle set-point temperature.

Figure 1:
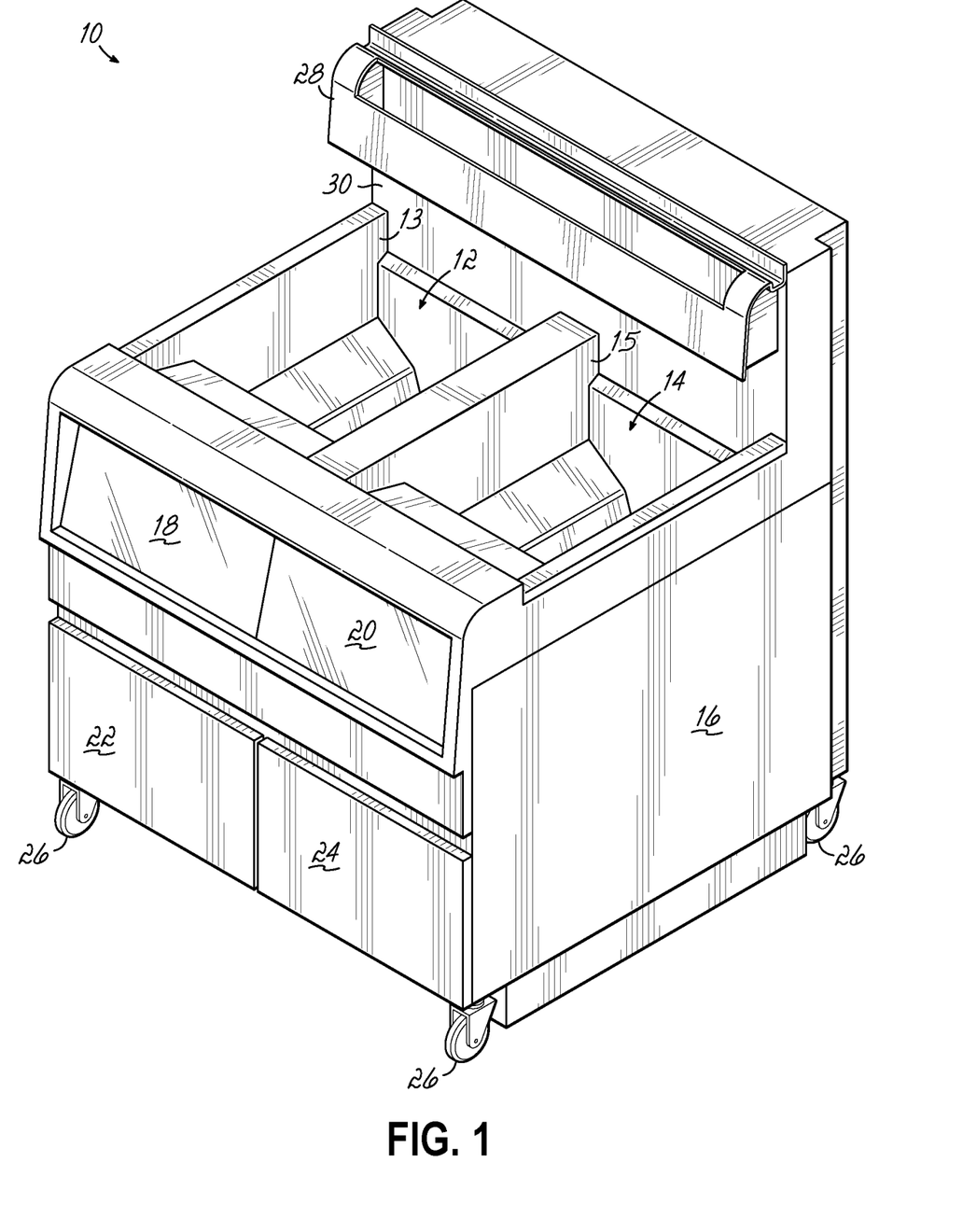
FIG. 1 is a perspective view of a fryer according to an embodiment of the invention.

Referring now to the figures, FIG. 1 depicts an exemplary fryer 10 in accordance with an embodiment of the invention. The fryer 10 includes fry pots 12, 14, a cabinet 16, control panels 18, 20, access panels 22, 24, wheels 26, a basket hanger 28, and a backsplash 30. Each of the fry pots 12, 14, cabinet 16, access panels 22, 24, basket hanger 28, and backsplash 30 may be constructed from stainless steel, mild steel, or some other suitable material. Each fry pot 12, 14 includes a respective opening 13, 15 though which a food product may be placed into the fryer 10.

Food products may be placed into the fry pots 12, 14, for example, by lowering a basket containing the food product into the fry pot 12, 14. At completion of a cooking cycle, the basket may be removed from the fry pot 12, 14 and hung from the basket hanger 28 to allow excess cooking medium to drain back into the fry pot 12, 14. Each of the fry pots 12, 14 may be associated with a corresponding one of the control panels 18, 20 to provide a human-machine interface for operating the fryer 10. The control panels 18, 20 may receive commands from, and display information regarding a status of the fryer 10 to an operator. The access panels 22, 24 may provide access to the interior of cabinet 16 to, for example, service the components of the fryer 10.

Exemplary fryer 10 is depicted as having a separate control panel 18, 20 for each fry pot 12, 14. However, it should be understood that one control panel could be configured to control multiple fry pots, and embodiments of the invention are not limited to fryers having a separate control panel for each fry pot. In addition, although the fryer 10 depicted in FIG. 1 is a gas-heated open fryer having two fry pots, it should be further understood that embodiments of the invention may also be used with pressure fryers and/or electrically heated fryers, as well as fryers having a different number of fry pots.

Figure 2:
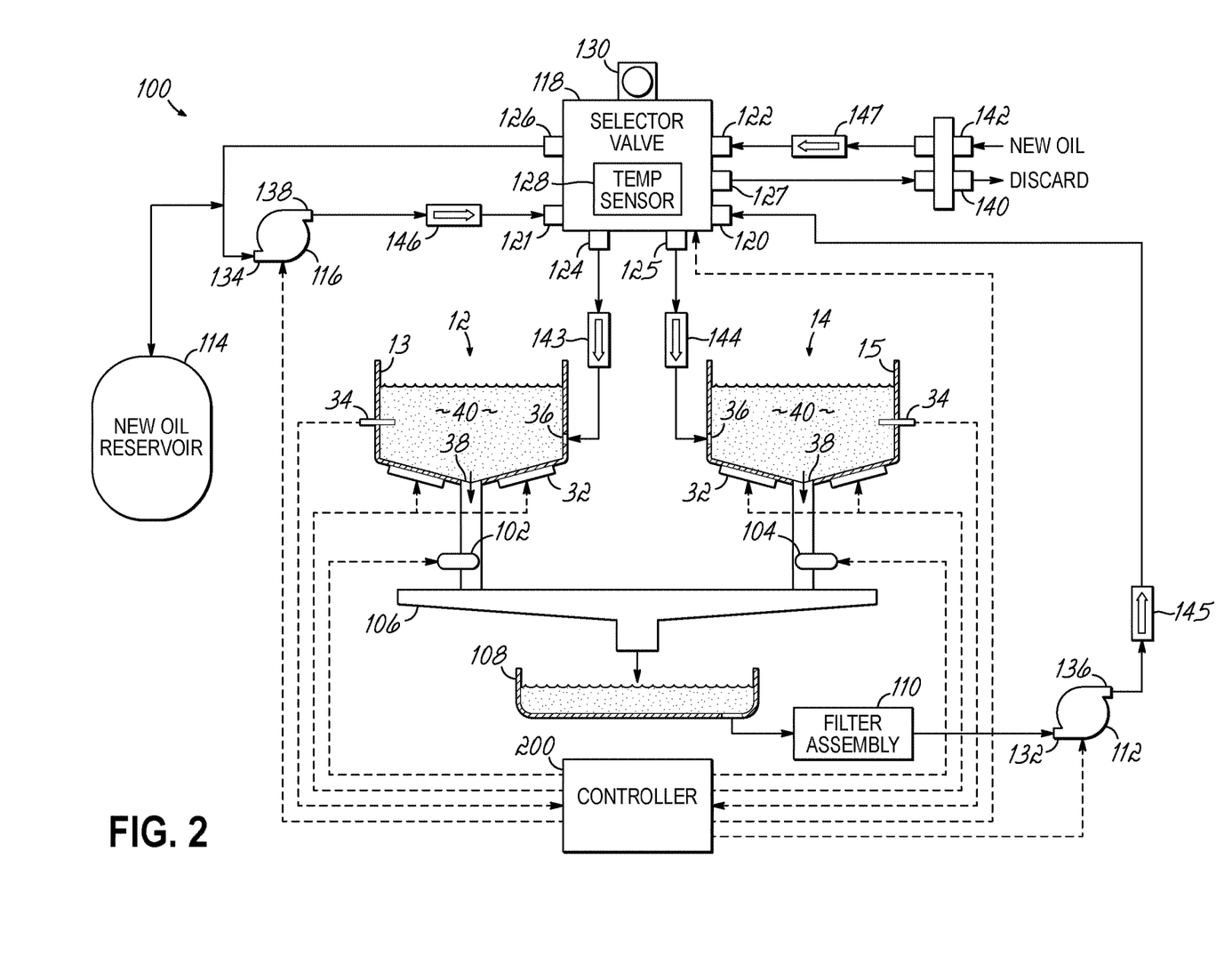
FIG. 2 is a diagrammatic view of the fryer of FIG. 1, depicting a plurality of fry pots, a filtration system, and a controller.

Referring now to FIG. 2, in addition to fry pots 12, 14, the fryer 10 may include a cooking medium handling system 100 and a controller 200. Each fry pot 12, 14 may include a heating element 32 (schematically shown), a temperature sensor 34, a fill port 36, and a drain port 38, and may be at least partially filled with a cooking medium 40. Suitable cooking mediums may include plant-based fats, animal-based fats, and/or synthetic (e.g., hydrogenated) fats. The heating element 32 may be disposed within or proximate to the fry pot 12, 14 for heating the cooking medium 40. The heating element 32 may include an electrical heating element (e.g., a heating coil immersed in the cooking medium 40) or a gas heating element (e.g., a gas burner and heat exchanger that transfers heat from the burner to the cooking medium 40).

The cooking medium handling system 100 may include drain valves 102, 104, a drain manifold 106, a drain pan 108, a filter assembly 110, a filter pump 112, a reservoir 114 of fresh cooking medium, a reservoir pump 116, and a selector valve 118. The selector valve 118 may include a plurality of input ports 120-122 and a plurality of output ports 124-127. A temperature sensor 128 may be located in the selector valve 118, or in another suitable location, to enable the controller 200 to determine the temperature of the cooking medium passing through the cooking medium handling system 100.

The selector valve 118 is configured to selectively fluidically couple one or more of the input ports 120-122 to one or more of the output ports 124-127. To this end, the selector valve 118 may comprise a rotary valve having a transverse plug (not shown) coupled to a motor 130. The motor 130 may cause the selector valve 118 to fluidically couple a selected input port to a selected output port by rotating the transverse plug to one of a plurality of predetermined positions. In an alternative embodiment of the invention, the selector valve 118 may comprise an assembly of valves that are configured to provide the desired selective fluidic coupling in response to signals from the controller 200. In this alternative embodiment, the selector valve 118 may comprise an assembly including a plurality of valves connected to a manifold.

The filter pump 112 and reservoir pump 116 may each include an inlet 132, 134 on a suction side of the pump, and an outlet 136, 138 on a pressure side of the pump. The inlet 132 of filter pump 112 may be fluidically coupled to the drain pan by the filter assembly 110, and the outlet 136 of the filter pump 112 may be fluidically coupled to an input port 120 of selector valve 118. Activation of the filter pump 112 may cause cooking medium 40 to be drawn from the drain pan 108 through the filter assembly 110 and provided to selector valve 118. The selector valve 118 may in turn provide the filtered cooking medium 40 to one of the fry pots 12, 14 for reuse and/or to a discard port 140 for disposal.

Although filter assembly 110 is depicted as being coupled to the inlet 132 of filter pump 112 in the exemplary embodiment illustrated by FIG. 2, it should be understood that the cooking medium handling system 100 is not limited to the specific arrangement of components depicted. For example, the filter assembly 110 could be coupled to the outlet 136 of filter pump 112 rather than the inlet 132 so that cooking medium 40 is pushed through the filter assembly 110 rather than drawn through the filter assembly 110. In either case, the filter assembly 110 may include a housing configured to accept a filter for filtering the cooking medium 40. Regular use of filtration cycles to clean the cooking medium 40 may reduce consumption of cooking medium 40 and increase the availability of the fryer 10 by providing hot filtered cooking medium 40 to the fry pots 12, 14.

The inlet 134 of reservoir pump 116 may be fluidically coupled to the reservoir 114, and the outlet 138 of the reservoir pump 116 may be fluidically coupled to an input port 121 of selector valve 118. Activation of reservoir pump 116 may cause cooking medium 40 to be drawn from reservoir 114 and provided to selector valve 118. The selector valve 118 may in turn provide the fresh cooking medium 40 to one of the fry pots 12, 14 to refill or replenish the cooking medium 40. A fill port 142 may be coupled to an input port of the selector valve 118 to facilitate the addition of cooking medium 40 to the reservoir 114. The cooking medium handling system 100 may further include check valves 143-147 that prevent cooking medium 40 from back-flowing from the fry pots 12, 14 into the selector valve 118, or from the selector valve 118 into either of the filter pump 112, reservoir pump 116, or fill port 142.

The controller 200 may be in communication with the heating element 32 and temperature sensor 34 of each of the fry pots 12, 14, the drain valves 102, 104, filter pump 112, reservoir pump 116, and temperature sensor 128 and motor 130 of selector valve 118. The controller 200 may control the various cooking and maintenance cycles of the fryer 10 by transmitting signals to, and receiving signals from these components of the fryer 10. The controller 200 may also be coupled to the control panels 18, 20 to provide operating information to, and receive input from the operator of the fryer 10. The controller 200 may control the temperature of the cooking medium 40 in each fry pot 12, 14 by selectively activating the respective heating element 32, and may control the filtering and addition of cooking oil by selectively activating the drain valves 102, 104, filter pump 112, reservoir pump 116, and motor 130 of selector valve 118.

Figure 3:
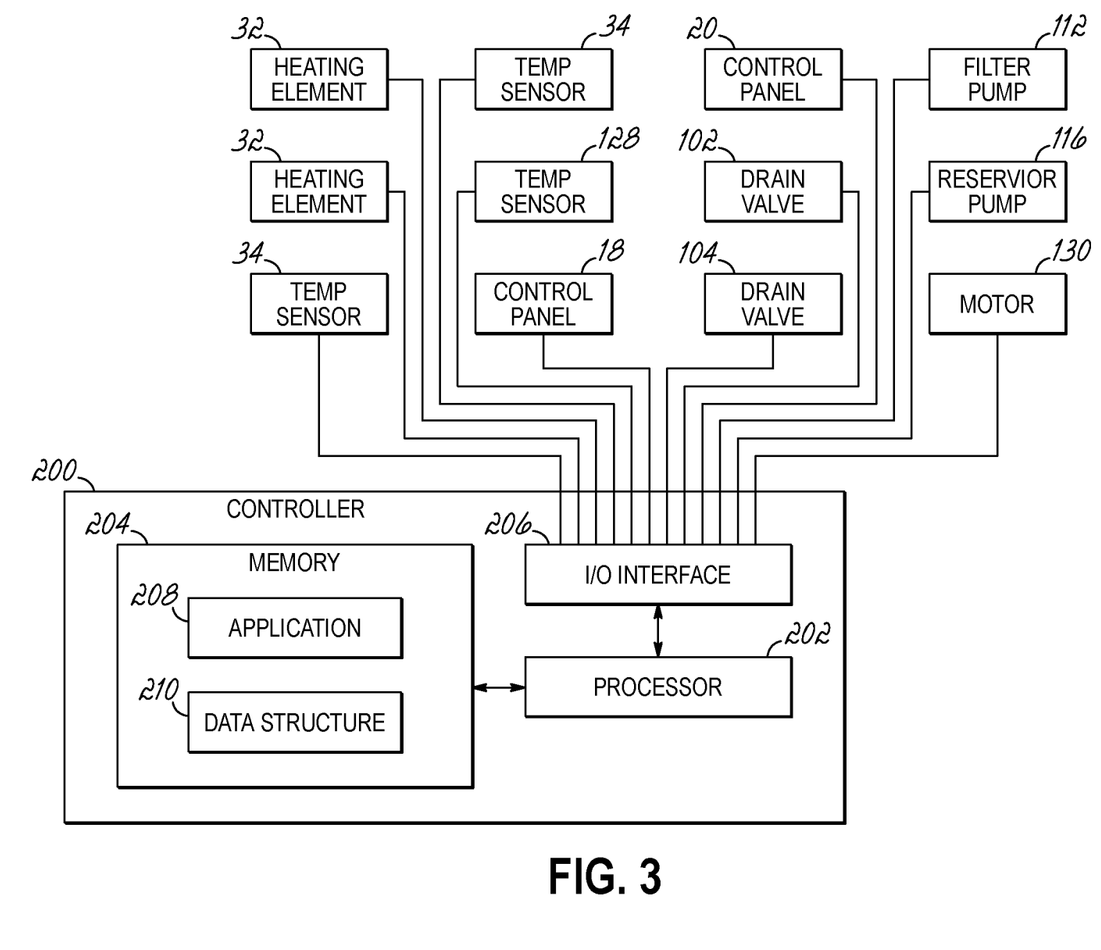
FIG. 3 is a diagrammatic view of the controller of FIG. 2.

Referring now to FIG. 3, the controller 200 may include a processor 202, a memory 204, and an input/output (I/O) interface 206. The processor 202 may include one or more devices configured to manipulate signals and/or data based on operational instructions that are stored in memory 204. Memory 204 may include a single memory device or a plurality of memory devices configured to store information in the form of data. The memory 204 may store computer program code embodied as one or more computer software applications comprising instructions executed by the processor 202, such as a controller application 208. One or more data structures 210 may also reside in memory 204, and may be used by the processor 202 and/or controller application 208 to store and process data.

The I/O interface 206 operatively couples the processor 202 to other components of the fryer 10, such as control panels 18, 20, heating elements 32, temperature sensors 34, 128, drain valves 102, 104, filter pump 112, reservoir pump 116, and motor 130 of selector valve 118. The I/O interface 206 may include signal processing circuits that condition incoming and outgoing signals so that the signals are compatible with both the processor 202 and the components to which the processor 202 is coupled. To this end, the I/O interface 206 may include analog-to-digital (A/D) and/or digital-to-analog (D/A) converters, voltage level and/or frequency shifting circuits, optical isolation and/or driver circuits, data busses, and/or any other analog or digital circuitry suitable for coupling the processor 202 to the other components of the cooking apparatus.

The control panels 18, 20 may be operatively coupled to the processor 202 of controller 200 to provide a user interface that allows the operator to interact with the controller 200. The control panels 18, 20 may include a display having suitable audio and visual indicators capable of providing information to the operator. The control panels 18, 20 may also include input devices and controls capable of accepting commands or input from the operator and transmitting the entered input to the processor 202. In this way, the control panels 18, 20 may enable manual initiation or selection of system functions, for example, during set-up of the fryer 10.

Figure 4:
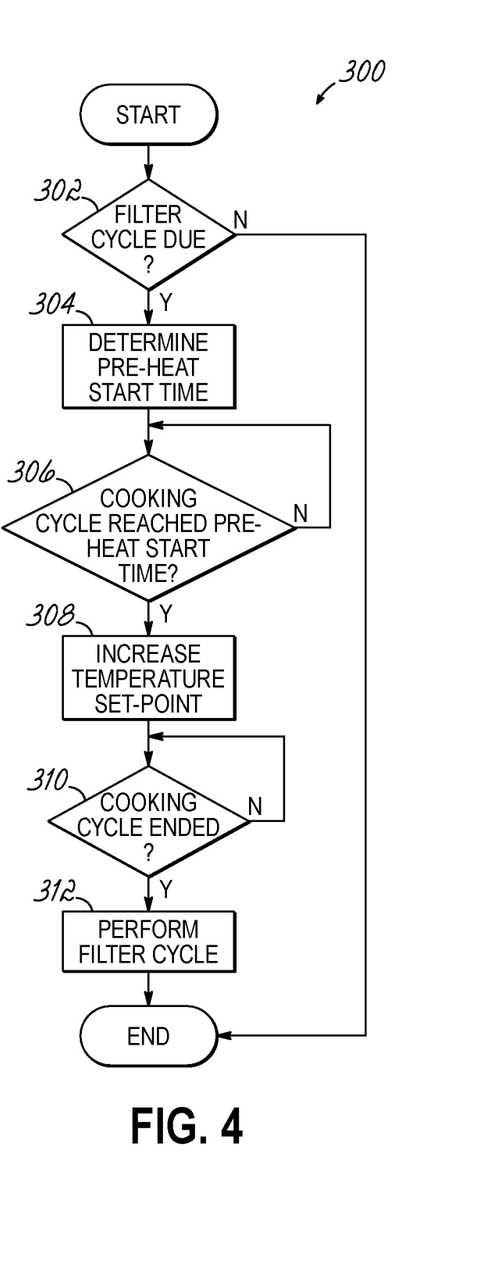
FIG. 4 is a flow chart of a filtration cycle preheating process that may be implemented by the controller of FIG. 2.

Referring now to FIG. 4, a flowchart is presented that depicts a process 300 which may be executed by the controller 200 to implement a filtration cycle in accordance with an embodiment of the invention. Different types of food products may require cooking cycles having different temperature set-points and/or durations. To begin a cooking cycle, the operator may select the cooking cycle for the type of food product being prepared using the control panel. The operator may then place a desired amount of the food product into a basket and lower the basket into the fry pot 12, 14. In block 302, the process 300 may determine if the cooking medium 40 is due for a filtration cycle. The process 300 may make this determination prior to or during the cooking cycle immediately preceding the filtration cycle.

The process 300 may determine the cooking medium 40 is due for filtration, for example, by accumulating weighted cooking cycles in a counter associated with the fry pot 12, 14 in question. The weighting of each cooking cycle may be pre-programmed into the controller 200 and based on an expected impact of the cooking cycle on the cooking medium 40, e.g., the temperature and duration of the cooking cycle, as well as how much contamination of the cooking medium 40 is expected from the food product. When the counter has reached 100% of the allowable weighted cooking cycles, the process 300 may determine that the cooking medium 40 is due for filtration. The process 300 may also determine that filtration is due from user input at the control panel 18, 20.

If the process 300 determines the filtration cycle is not due ("NO" branch of decision block 302), the process 300 may terminate and allow the cooking cycle to proceed normally. If the process 300 determines that the filtration cycle is due ("YES" branch of decision block 302), the process may proceed to block 304.

In block 304, the process 300 may determine the filtration cycle pre-heat start time and proceed to block 306. The pre-heat start time may be selected to provide a sufficient amount of time prior to completion of the cooking cycle to heat the cooking medium 40 from the cooking cycle temperature set-point ($T_{SET\_1}$) to a filtration cycle temperature set-point ($T_{SET\_2}$). For example, if activating the heating element 32 produces a one degree Fahrenheit per second (1° F./sec.) increase in the temperature of the cooking medium 40, the pre-heat start time may be set to $T_{SET\_2} - T_{SET\_1}$.

In block 306, the process 300 may determine if the cooking cycle is within a predetermined amount of time of completion of the cooking cycle, i.e., that the cooking cycle has reached the pre-heat start time. If the cooking cycle has not reached the pre-heat start time ("NO" branch of decision block 306), the process 300 may continue monitoring the cooking cycle. If the cooking cycle has reached the pre-heat start time ("YES" branch of decision block 306), the process 300 may proceed to block 308 to thereby increase the temperature set-point from the cooking cycle temperature set-point to the filtration cycle temperature set-point, and proceed to block 310. Increasing the temperature set-point may cause a temperature control process in the controller 200 to begin adjusting the temperature of the cooking medium 40, e.g., by activating the heating element 32.

In an embodiment of the invention, the filtration cycle temperature set-point may be limited to a maximum set-point temperature delta ($T_A = T_{SET\_2} - T_{SET\_1}$), e.g., 10° F. The filtration cycle temperature set-point may also be limited to an overall maximum temperature $T_{MAX}$. That is, the filtration cycle set-point temperature may be capped at a maximum temperature (e.g., 375° F.) that is the maximum allowable temperature for the cooking medium 40 in use. By way of example, for a cooking cycle set-point of 350° F., a maximum set-point delta $T_A = 10°$ F., and a maximum temperature $T_{MAX} = 375°$ F., the filtration cycle set-point temperature would be 360° F. For the same set-point temperature delta $T_A$ and maximum temperature $T_{MAX}$, a type of food product having a cooking cycle temperature set-point of 370° F. would have a filtration cycle set-point temperature of 375° F. In an alternative embodiment of the invention, the filtration cycle set-point temperature may simply be the maximum temperature $T_{MAX}$ without regard to the cooking cycle temperature set point. In this embodiment, $T_A$ would equal $T_{SET\_1} - T_{MAX}$.

The pre-heat start time may vary in dependence on the cooking cycle and filtration cycle temperature set-points, and the rate of change in temperature produced by the heating element 32. For example, the pre-heat start time may vary from between zero and 20 seconds before the end of the cooking cycle. In an embodiment of the invention, the pre-heat start time may be selected to limit the amount of heat that is actually transferred from the heating element 32 to the cooking medium 40 in order to minimize any effects on the cooking cycle. In this case, the reduction in reheating time after the filtration cycle may result largely from heat that is in the process of moving from the heating element 32 into the cooking oil when the filtration cycle starts. That is, the reduction in reheating time may result primarily from the heat stored in the thermal mass of the heating element 32 and/or heat exchanger that has yet to be transferred into the cooking medium 40 at the start of the filtration cycle rather than in the cooking medium 40 itself.

The process 300 may request approval from the operator before, or immediately after, increasing the temperature set-point, e.g., by displaying a pop-up window or other suitable prompt to the user. If the user refuses the filtration cycle (e.g., by activating a button on the pop-up window indicating the filtering operation should be skipped), the process 300 may return the temperature set-point to the previous cooking cycle temperature set-point and terminate. In an alternative embodiment of the invention, the process 300 may be configured to increase the temperature set-point and/or enter the filtration cycle without prompting the operator or otherwise allowing the operator to refuse the filtration cycle. In this embodiment, the process 300 may automatically enter the filtration cycle without user input.

In cases where the user does not immediately refuse the filtration cycle, the cooking medium 40 may be over the cooking cycle temperature set-point at the start of the next cooking cycle. However, this is not believed to significantly affect the next cooking cycle. The next load of food product typically pulls a significant amount of heat out of the cooking medium 40, which may reduce the temperature of the cooking medium 40 back toward the cooking cycle temperature set-point. Any effects from this initial over-temperature on the food product may be further mitigated by a load compensation process in the controller 200 that monitors the temperature of the cooking medium 40 during the cooking cycle, and adjusts the cooking cycle timer accordingly.

In block 312, the process 300 may open the drain valve 102, 104, thereby allowing the cooking medium 40 to flow from the fry pot 12, 14 into the drain pan 108, e.g., under the force of gravity. Sometime after opening of the drain valve 102, 104, the process 300 may activate the filter pump 112 so that the cooking medium 40 is conveyed from the drain pan 108 back into the fry pot 12, 14 via the fill port 36. The process 300 may monitor the amount of time that the filter pump 112 is activated to determine the amount of cooking medium 40 transferred from the drain pan 108 into the fry pot 12, 14. For example, the process 300 may activate the filter pump 112 for a predetermined amount of time sufficient to filter the amount of cooking medium 40 contained by the fry pot 12, 14.

Concurrently with or shortly after the filtration cycle, the process 300 may activate the reservoir pump 116 to add cooking medium 40 to the fry pot 12, 14 from the reservoir 114. The process 300 may activate the reservoir pump 116, for example, in response to determining that the cooking medium 40 in the fry pot 12, 14 is below a recommended level, e.g., below a target fill-line of the fry pot 12, 14. The process 300 may also activate the reservoir pump 116 for a predetermined amount of time to replace an amount of cooking medium 40 normally lost during the filtration cycle, or until the process 300 determines the level of cooking medium 40 in the fry pot 12, 14 has reached the recommended level. The process 300 may determine the cooking medium 40 has reached the recommended level, for example, based on a signal from a cooking medium level sensor (not shown) that indicates the fry pot 12, 14 is full.

Figure 5:
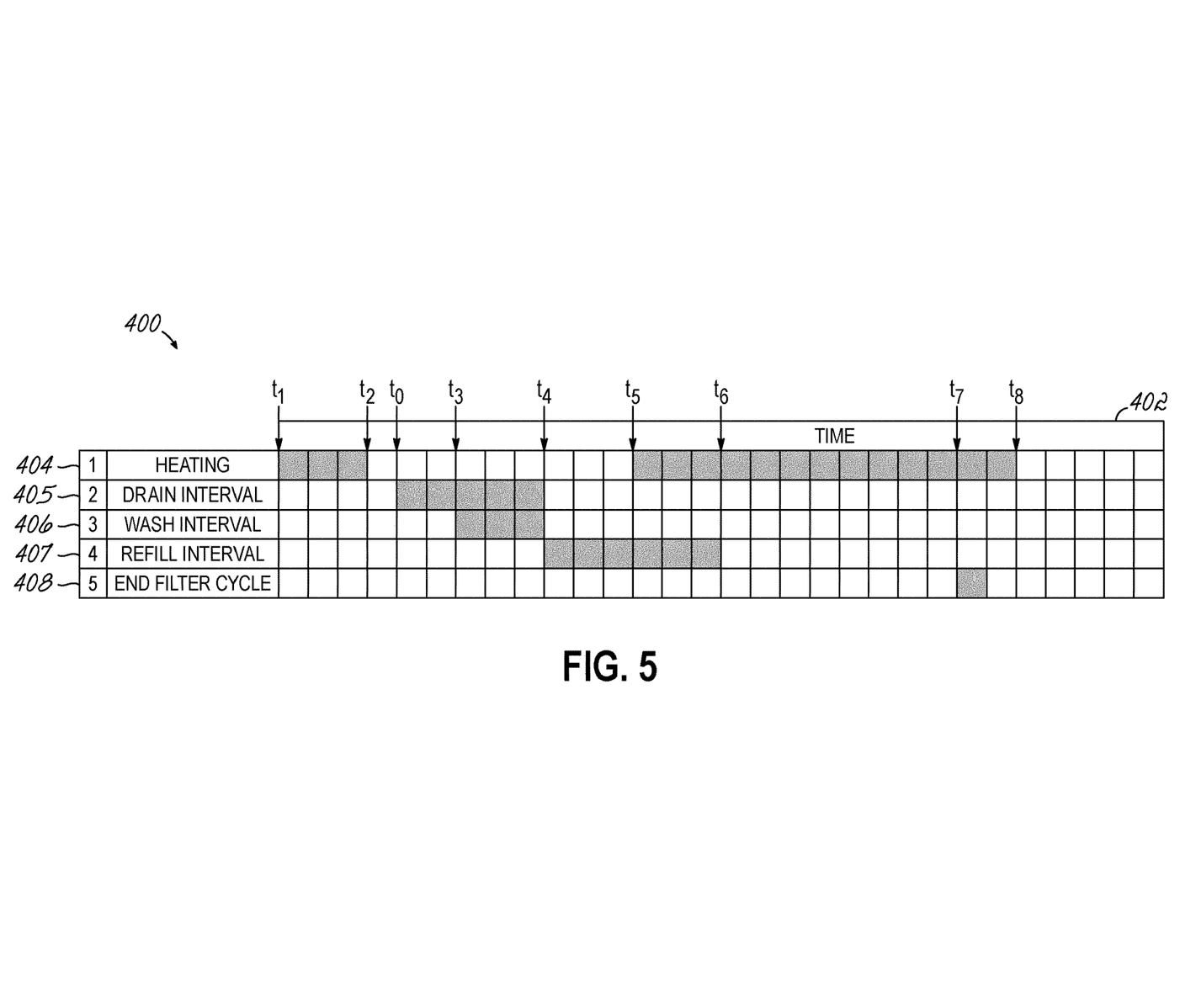
FIG. 5 is a graphical view showing a fryer control schedule for a filtration cycle.

Referring now to FIG. 5, and for purposes of illustration only, an exemplary bar chart is presented that depicts a fryer control schedule for a filtration cycle in accordance with an embodiment of the invention. The chart 400 includes a horizontal axis 402 corresponding to an amount of time (e.g., a number of seconds) relative to the end of the cooking cycle at $t = t_0$, and a plurality of rows 404-408. Each of the rows 404-408 may correspond to a process, event, interval, or cycle, such as activation of the heating element 32 (event 404), occurrence of a drain interval 405, occurrence of a wash interval 406, occurrence of a refill interval 407, and completion of the filtration cycle 408. Shaded portions of the rows may indicate that the respective process, event, or interval is active during that time period.

At time $t_1$ (e.g., $t_0 - 20$ seconds) the controller 200 may begin preheating the cooking medium 40 by activating the heating element 32. As shown by the shading of row 404, the heating element 32 may be active from time $t_1$ until time $t_2$, e.g., from $t_0 - 20$ seconds until $t_0 - 5$ seconds. Activation of the heating element 32 may provide heat to any or all of the heating element 32, the components thermally coupling the heating element 32 to the cooking medium 40, and the cooking medium 40 itself. At time $t_0$, the cooking cycle may end, at which point the controller 200 may begin a drain interval by activating the drain valve. Activating the drain valve may cause the cooking medium 40 to flow from the fry pot 12, 14 into drain pan 50 as described above. The drain interval may be active until $t_3$ (e.g., $t = t_0 + 10$ seconds), which may be an amount of time necessary to allow the cooking medium 40 to fully drain from the fry pot 12, 14.

At $t_3$, the controller 200 may begin a wash interval of the filtration cycle. The wash interval may include activating the filter pump 112 for one or more periods of time to provide filtered cooking medium 40 to the now empty fry pot 12, 14.

The filtered cooking medium 40 may be provided to the fry pot 12, 14 through a wash port that directs the cooking medium 40 into the fry pot 12, 14 in a controlled manner. The wash port may be configured to cause the cooking medium 40 to wash debris (e.g. sentiment, foreign particles, crumbs, clumps, and cracklings) from the sides and/or bottom of the fry pot 12, 14. To improve the effectiveness of the wash interval, the wash port may include a nozzle configured to increase the velocity of the cooking medium 40 to more effectively flush debris toward the drain. The nozzle may also control the areas of the fry pot 12, 14 that are washed by the cooking medium 40. During the wash interval, the drain valve may remain open to allow the sediment washed from the fry pot 12, 14 to flow into the drain pan.

The wash interval may continue until time $t_4$ (e.g., $t_0+25$ seconds). At time $t_4$, the controller 200 may exit the wash interval and enter a refill interval of the filtration cycle. During the refill interval of the filtration cycle, the drain valve may be closed to allow the filtered cooking medium 40 to collect in the fry pot 12, 14. At time is (e.g., $t_0+40$ seconds), the cooking medium 40 may have reached a level in the fry pot 12, 14 sufficient for the controller 200 to reactivate the heating element 32. The controller 200 may determine that the cooking medium 40 has reached this predetermined level, for example, based on a signal from the temperature sensor 34 indicating that the cooking medium 40 has reached the temperature sensor 34.

The temperature indicated by the temperature sensor 34 may lag the temperature at the sensor, and/or it may take some time until enough cooking medium 40 has entered the fry pot 12, 14 for the cooking medium 40 to reach the temperature sensor 34. Conventional systems may wait until the cooking medium 40 has reached the temperature sensor 34 and a baseline temp has been reached. This may delay activation of the heating element 32, which is not normally activated when the fry pot 12, 14 is empty to avoid burning the cooking medium 40 and/or any particulate matter in the fry pot 12, 14.

In an embodiment of the invention, the controller 200 may monitor the temperature sensor 128 of selector valve 118. This may allow the controller 200 to validate that cooking medium 40 is flowing into the fry pot 12, 14 as soon as the cooking medium 40 reaches the selector valve. The controller 200 may then activate the heating element 32 as soon as the controller 200 detects cooking medium 40 has reached the temperature sensor 34 without having to wait for a baseline temperature to be established using signals from temperature sensor 34. Advantageously, embodiments of the invention including the temperature sensor 128 in the selector valve 118 may activate the heating element 32 earlier (e.g., 5 to 8 seconds after $t_4$) in the filtration cycle than fryers lacking this feature.

At time $t_6$, and in response to the controller 200 determining that the fry pot 12, 14 is full, the controller 200 may exit the refill interval of the filtration cycle. The controller 200 may determine that the fry pot 12, 14 is full, for example, based on an amount of time the filter pump 112 has been running, a known flow rate of the cooking medium 40, and/or signals from a cooking medium level sensor. The controller 200 may exit the filtration cycle at time $t_7$, and return control of the heating element 32 to the main control process and/or a cooking cycle process.

The controller 200 may keep the heating element 32 active until time $t_8$, which may coincide with the temperature of the cooking medium 40 reaching a desired set-point. The length of the heating interval may be related to the power output of the heating element 32. The higher the power output, the less amount of time may be required to reach the desired set-point temperature. During the heating interval, the controller 200 may control the output of the heating element 32 to avoid excessive overshoots of the set-point temperature, e.g., by cycling the heating element 32 on and off and/or using pulse width modulation. The controller 200 may not indicate the cooking medium 40 is ready unless the temperature of the cooking medium 40 is within a predefined threshold temperature (e.g., ±5° F.) of the cooking cycle set-point. Increasing this predefined threshold temperature (e.g., to ±10° F.) may allow the heating element 32 to be operated at a higher output level during the reheating phase of the filtration cycle.

Although the exemplary embodiment depicted by FIG. 5 shows the heating element 32 as being inactive between time $t_2$ and time $t_5$, the invention is not so limited. Thus, it should be understood that the heating element 32 may be activated during all or a portion of this time to add additional heat to the cooking medium 40 and/or components of the fryer 10, and to further reduce the amount of time necessary to reach the cooking cycle set-point temperature following the filtration cycle.

Testing has shown that increasing the threshold temperature does not make a significant difference in the cooking of the food product following a filtration cycle. It believed that the differences in the results of cooking cycles using the lower and the higher threshold temperatures is minimized due, at least in part, to the higher threshold resulting in a cooking cycle that starts further below cooking set-point coming out of a filter cycle. This lower cooking cycle start temperature may compensate for the higher resulting overshoot in the temperature of the cooking medium 40. In addition, the higher threshold temperature may result in the heating element 32 being fully heated at the start of the cooking cycle, thereby improving response time of the cooking medium temperature to a new cook load.

In contrast, operating the heating element 32 at a low duty cycle to avoid overshoot has been found to cause the heating element 32 to lose most of its internal energy to the cooking medium 40 by the start of the cooking cycle. As a result, if the next load of food product produces a high cooking load, there may be an additional delay in bringing the temperature of the cooking medium 40 back to the cooking set-point temperature. This delay is believed to be due to the heating element 32 having lost most of its energy at the beginning of the cooking cycle, which then needs to be replenished before the heating element 32 can start significantly heating the cooking medium 40 in a significant way.

Adding heat before the filter cycle begins may result in a net effect of reducing the amount of time spent performing the filtration process, and may also improve the quality of the cooked food product. During the filter cycle, the heating element 32 may remain off during the drain and wash intervals, but may be activated in response to the controller 200 determining that cooking medium 40 has reached the temperature sensor 34 during the refill interval. The heating element 32 may be used to add heat to the cooking medium 40 through the remaining fill interval of the filter cycle, and remain on until the cooking medium 40 has reached the desired set-point temperature. The use of pre-heating and earlier activation of the heating element 32 during the fill interval may reduce the total time required to complete the filtration cycle, e.g., to under 2 minutes. In comparison, a filtration cycle (including reheating time) for a conventional fryer may take approximately 5 minutes.

Because the pre-heating of the cooking medium 40 occurs before the previous cook cycle has ended, as well as during the time interval between when the fryer 10 prompts the user to acknowledge the filtration cycle and the time the user acknowledges the filtration cycle, the heating of the cooking medium 40 during this time does not impact the filtering or cooking cycle times. As a result, embodiments of the invention shorten the time from the end of the cooking cycle prior to the filtration cycle, and the start of the cooking cycle subsequent to the filtration cycle. Advantageously, this shortening of the filtration cycle not only increases the throughput of the fryer 10, it also encourages users to allow the filtration cycle to occur more frequently, thereby increasing the operational life of the cooking medium 40.

In general, the routines executed to implement the embodiments of the invention, whether implemented as part of an operating system or a specific application, component, program, object, module or sequence of instructions, or a subset thereof, may be referred to herein as "computer program code," or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of filtering a cooking medium in a fryer comprising:
   (a) controlling automatically by a controller, a temperature of the cooking medium in a fry pot using a first temperature set-point during a cooking cycle;
   (b) determining automatically by a controller, that a filtration cycle is scheduled to follow the cooking cycle;
   (c) controlling automatically by a controller, the temperature of the cooking medium in the fry pot during at least a portion of the cooking cycle that includes immediately before an end of the cooking cycle based on the determining at step (b); and
   (d) performing automatically by a controller, the filtration cycle after the end of the cooking cycle, the filtration cycle including at least draining at least a portion of the cooking medium from the fry pot into a drain pan, filtering the cooking medium that has been drained, and returning the filtered cooking medium to the fry pot,
   wherein the controlling of the temperature at step (c) uses a second temperature set-point that is higher than the first temperature set-point to thereby raise the temperature of the cooking medium before the filtration cycle is performed at step (d).

2. The method of claim 1 wherein controlling the temperature of the cooking medium in the fry pot at step (c) further comprises:
   determining the cooking cycle is within a predetermined amount of time of completion; and
   in response to determining the cooking cycle is within the predetermined amount of time, activating a heating element to increase the temperature of the cooking medium in the fry pot beyond the first temperature set-point.

3. The method of claim 2 further comprising:
   prior to entering the filtration cycle, deactivating the heating element.

4. The method of claim 3 further comprising:
   during the filtration cycle and in response to determining the cooking medium has reached a predetermined level in the fry pot during a refill, activating the heating element.

5. The method of claim 4 wherein the heating element is controlled using one of the first temperature set-point or the second temperature set-point when activated during the filtration cycle.

6. The method of claim 1 further comprising:
   receiving data from a user interface of the fryer; and
   only draining the at least a portion of the cooking medium from the fry pot into the drain pan if the data indicates the fryer should proceed with the filtration cycle.

7. The method of claim 6 further comprising:
   in response to the data indicating the fryer should not proceed with the filtration cycle, resuming control of the temperature of the cooking medium in the fry pot using the first temperature set-point.

8. The method of claim 6 further comprising:
   displaying, on the user interface, a prompt requesting a user confirm the filtration cycle, wherein the data indicating the fryer should proceed with the filtration cycle is received from the user interface in response to the user confirming the filtration cycle.

9. The method of claim 1 wherein the first temperature set-point depends on a type of food product being cooked during the cooking cycle.

10. The method of claim 1 wherein the second temperature set-point is equal to one of the following, whichever is less:
    a sum of: a preset temperature difference value plus the first temperature set-point, or
    an overall maximum temperature.

11. The method of claim 10 wherein when the second temperature set-point is not the overall maximum temperature, the preset temperature difference value is 10 degrees Fahrenheit.

12. The method of claim 1 wherein the first temperature set-point is a cooking cycle temperature set-point that is selected for cooking a food product in the cooking cycle, the second temperature set-point is a filtration cycle temperature set-point, and the step of controlling the temperature of the cooking medium in the fry pot at step (c) is performed to preemptively heat up the cooking medium above the cooking cycle temperature set-point before an end of the cooking cycle, thereby to start the filtration cycle with cooking medium at a higher temperature and thus reduce a reheating time period needed after the filtration cycle to return the cooking medium back to the cooking cycle temperature set-point after a temperature drop that occurs during the filtration cycle.

13. A method of filtering a cooking medium in a fryer comprising:
    performing a plurality of cooking cycles with the fryer, wherein the method includes, in each cooking cycle of the plurality of cooking cycles:
       (a) controlling automatically by a controller, a temperature of the cooking medium in a fry pot using a first temperature set-point during the cooking cycle;
       (b) determining automatically by a controller, whether a filtration cycle is scheduled to follow the cooking cycle; and
       (c) controlling automatically by a controller, the temperature of the cooking medium in the fry pot during at least a portion of the cooking cycle that includes immediately before an end of the cooking cycle based on the determining at step (b);
    wherein in a first cooking cycle of the plurality of cooking cycles, the determining at step (b) reveals that a filtration cycle is scheduled to follow the cooking cycle, and the method further includes:
       at step (c) during the first cooking cycle, the controlling of the temperature uses a second temperature set-point that is higher than the first temperature set-point to thereby raise the temperature of the cooking medium before the filtration cycle is performed; and
       (d) performing automatically by a controller, the filtration cycle after the end of the first cooking cycle, the filtration cycle including at least draining at least a portion of the cooking medium from the fry pot into a drain pan, filtering the cooking medium that has been drained, and returning the filtered cooking medium to the fry pot;
    wherein in a second cooking cycle of the plurality of cooking cycles, the determining at step (b) reveals that a filtration cycle is not scheduled to follow the cooking cycle, and the method further includes:
       at step (c) during the second cooking cycle, the controlling of the temperature continues to use the first temperature set-point to thereby maintain the temperature of the cooking medium until an end of the second cooking cycle.

14. A fryer comprising:
a fry pot defining a single cooking chamber for receiving a food product that is to undergo a cooking cycle; and
a controller that controls operation of the fryer and is programmed to:
   (a) control a temperature of the cooking medium in the fry pot using a first temperature set-point during the cooking cycle;
   (b) determining that a filtration cycle is scheduled to follow the cooking cycle;
   (c) controlling the temperature of the cooking medium in the fry pot during at least a portion of the cooking cycle that includes immediately before an end of the cooking cycle based on the determining at step (b); and
   (d) performing the filtration cycle after the end of the cooking cycle, the filtration cycle including at least draining at least a portion of the cooking medium from the fry pot into a drain pan, filtering the cooking medium that has been drained, and returning the filtered cooking medium to the fry pot,
wherein the controlling of the temperature at step (c) uses a second temperature set-point that is higher than the first temperature set-point to thereby raise the temperature of the cooking medium before the filtration cycle is performed at step (d).

\* \* \* \* \*

UNITED STATES PATENT AND TRADEMARK OFFICE
CERTIFICATE OF CORRECTION

PATENT NO. : 11,191,390 B2  
APPLICATION NO. : 16/083169  
DATED : December 7, 2021  
INVENTOR(S) : Mark Gogel Page 1 of 1

It is certified that error appears in the above-identified patent and that said Letters Patent is hereby corrected as shown below:

In the Specification

Column 9, Line 21, reads "to collect in the fry pot 12, 14. At time is (e.g., $t_0+40$" and should read -- to collect in the fry pot 12, 14. At time $t_s$ (e.g., $t_0+40$ --.

In the Claims

Column 13, Claim 1, Line 4, reads "(a) controlling automatically by a controller, a tempera-" and should read -- (a) controlling, automatically by a controller, a tempera- --.

Column 13, Claim 1, Line 7, reads "(b) determining automatically by a controller, that a" and should read -- (b) determining, automatically by a controller, that a --.

Column 13, Claim 1, Line 10, reads "(c) controlling automatically by a controller, the tempera-" and should read -- (c) controlling, automatically by a controller, the tempera- --.

Column 13, Claim 1, Line 15, reads "(d) performing automatically by a controller, the filtration" and should read -- (d) performing, automatically by a controller, the filtration --.

Column 14, Claim 13, Line 30, reads "(a) controlling automatically by a controller, a tempera-" and should read -- (a) controlling, automatically by a controller, a tempera- --.

Column 14, Claim 13, Line 33, reads "(b) determining automatically by a controller, whether" and should read -- (b) determining, automatically by a controller, whether --.

Column 14, Claim 13, Line 36, reads "(c) controlling automatically by a controller, the tempera-" and should read -- (c) controlling, automatically by a controller, the tempera- --.

Column 14, Claim 13, Line 50, reads "(d) performing automatically by a controller, the filtra-" and should read -- (d) performing, automatically by a controller, the filtra- --.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*